Dec. 22, 1942.   H. F. KHOENLE   2,306,259
FISHING REEL
Filed Jan. 7, 1942
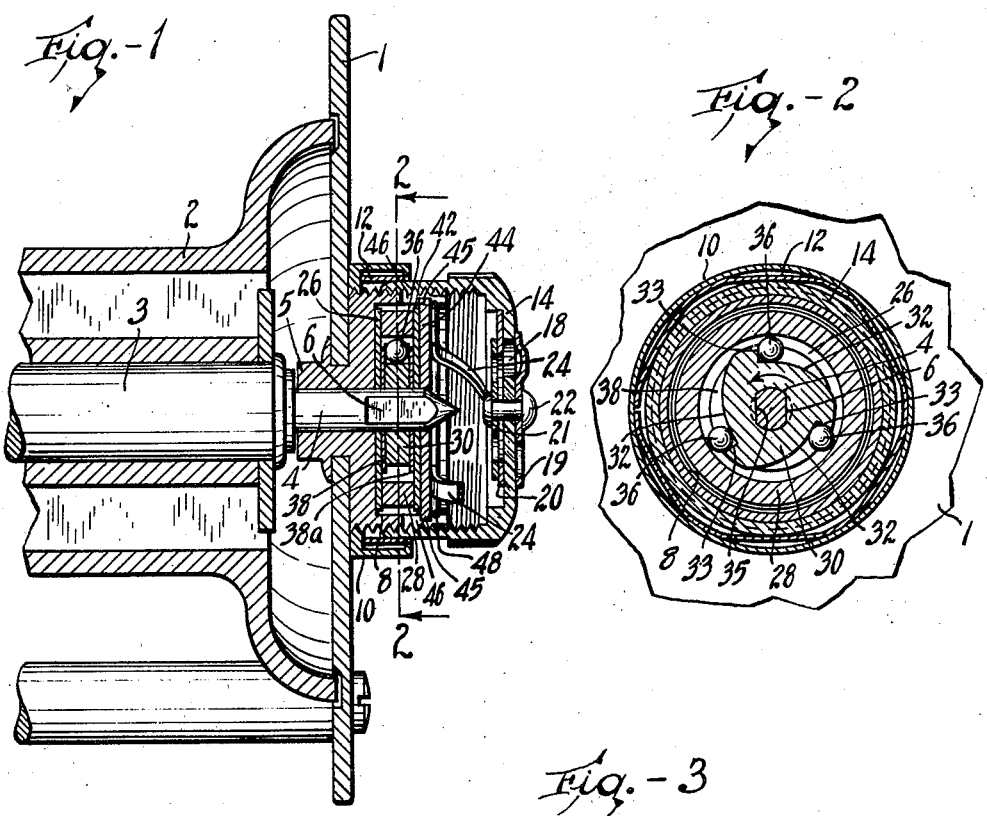
INVENTOR
HERMAN F. KHOENLE
BY Ely & Frye
ATTORNEYS Patented Dec. 22, 1942

2,306,259

UNITED STATES PATENT OFFICE 2,306,259

FISHING REEL

Herman F. Khoenle, Akron, Ohio, assignor to The Enterprise Manufacturing Company, Akron, Ohio, a corporation of Ohio Application January 7, 1942, Serial No. 425,871

8 Claims. (Cl. 242—84.5)

The present invention relates to fishing reels and particularly to bait casting reels, although the improvements shown and described herein may be adapted to other forms of fishing reels.

The object of the present invention is to improve upon the drag mechanism which is the subject matter of applications of Walter L. Adams, Serial No. 275,412, filed May 24, 1939, and Joseph D. Kreis, Serial No. 334,183, filed May 9, 1940. In the former constructions, reels are provided with a drag or anti-backlash located within a housing on the back plate of the reel, the friction retarding means comprising a plurality of superposed plates or disks one of which is associated with a clutch by which it is connected with the spool shaft so as to bring the drag mechanism into play when the spool is rotated in one direction, the spool being freely rotatable in the opposite direction.

While the constructions shown in the prior applications are practical and successful, it has been found that each of them, due to the construction of the clutch device, is more noisy than is desirable in certain types of reels, particularly of the bait casting type. The drag mechanism herein disclosed is not only quiet, but efficient and inexpensive to manufacture. While it is especially designed for the particular purpose of providing an effective and quiet anti-backlash attachment for bait casting reels, the principles of the invention may be employed in other forms and types of reels.

In the drawing in which the best known or preferred form of the invention is shown:

Fig. 1 is a section taken along the axis of the spool shaft, showing the back plate of the reel;

Fig. 2 is a section on the line 2—2 of Fig. 1; and

Fig. 3 is a composite view showing the several elements which constitute the improved drag mechanism separated from one another.

In the drawing only a portion of the complete reel is shown, as the balance of the reel may be of any suitable design. The numeral 1 represents the back plate of the complete reel, 2 the spool and 3 the spool shaft which is provided with a reduced extension 4 received in a bearing 5 set in the back plate and extending into the drag mechanism. The end of the shaft is formed with flattened areas 6 providing a non-rotative connection with the clutch element of the drag mechanism.

The bearing 5 is provided on its outer surface with a circular cup-shaped socket 8 which provides a housing for the drag mechanism, the outer surface of the housing being screw-threaded as shown. Over this screw-threaded portion is threaded a flanged ring 10 around the inner periphery of which is located a light, spring metal strip 12 of polygonal shape which constitutes a spring locking means to hold the cap 14 in place against accidental movement. The cap 14, which covers the housing and holds the friction retarding elements in place, is threaded on the exterior of the housing and projects into the spring locking ring 12. When removed, the cap permits the contents of the housing to be removed for cleaning, repair or inspection without disturbing or disconnecting any other parts of the reel. It is provided with an oiling hole 18 covered by a rotatable shutter 19. Against the interior of the cap is located a light, spring metal ring 20 which is held in place by means of a perforated metal disk 21, the parts being secured in position by the rivet 22 which also holds the shutter 19. From the disk are struck up a plurality of fingers 24 which bear upon the pile of superposed elements constituting the friction drag mechanism to exert a yielding pressure thereon. The pressure exerted upon the drag mechanism may be adjusted to any desired degree by turning the cap on the housing. As the pressure exerted by the spring fingers, when the cap is at its outer position, is light, a very delicate adjustment of the drag mechanism is obtainable, and this is especially valuable when the device is to be used as an anti-backlash mechanism in bait casting reels. The force of the drag can be increased by merely rotating the cap, and in such case it will act as an effective drag. The ring 20 is rotatable relative to the cap, so that it is not fixed thereto, and this prevents any deformation of the spring fingers 24, should they catch in the grooves 46, to be described. The perforations in the disk 21 are provided so that in any position of the disk a passage for oil from the hole 18 will not be obstructed.

The base of the cup or housing 8 forms one of the several elements of the friction drag mechanism. Over this surface and surrounding the shaft extension 4 is a disk 26, preferably of phosphor bronze, which constitutes a second friction element. On this disk is mounted a heavier ring 28, usually of steel, the inner periphery of which acts as a clutch surface, and lying within this ring is the second member 30 of the clutch which is in the form of a cam wheel with a plurality of cam surfaces 32, each of which is formed on a long arc which starts at the base of a radially flat surface 33 and terminates close to the inner surface of the ring 28. Any desirable number of these cam surfaces may be provided, but it is preferred to divide the cam member into three equal areas. The center of the cam member is formed with a flat sided opening 35 which fits over the flattened surfaces of the shaft extension and is driven thereby. While it is preferred to form the cam surfaces on arcs to insure better gripping action, these surfaces may be straight.

In each triangular space formed by the inner wall of the ring 28 and the radial and arcuate surfaces of the cam 30 is located a steel ball 36 which, when resting against the surface 33, clears the inner surface of the ring, but which will ride up the cam surfaces 32 when the clutch is rotated in the direction of the arrow in Fig. 2 and lock the ring so that it will rotate with the spool shaft. This clutching action occurs when the spool is revolving in the outgoing direction, or when the line is unwinding as in casting the bait, or when the fish is running with the line.

It will be noted that the cam-clutch is slightly less in thickness than the depth of the ring. The object of this construction is to admit of introduction of two thin, hardened steel disks or washers 38 and 38ª on either side of the cam-clutch element, these washers being keyed to the shaft by the flattened openings 40, the aggregate thickness of the elements 30, 38 and 38ª being slightly less than the depth of the ring 28. The purpose of this construction is to prevent noise when the reel is in operation because the balls are in contact with the washers 38 and 38ª at all times. If the balls contacted directly with the adjacent friction members, the rotation of the balls against the friction elements would create objectionable noise. These disks also prevent the excessive wear which would arise were the balls permitted to ride against the phosphor bronze friction disks 26 and 42.

Over the clutch element is placed a second friction disk 42 and superposed over the pile is the pressure plate or element 44 which fits loosely over the end of the shaft, but is provided with lugs or ears 45 which engage in slots 46 cut into the wall of the housing so that the pressure plate 44 is feathered to the housing and cannot rotate therein, but is capable of axial movement responsive to the pressure exerted on the outer face of the plate 44 by the spring fingers 24.

In order to prevent accidental loss of the various elements of the friction drag mechanism when the cap is removed, a light, circular split wire ring 48, normally somewhat larger than the interior circumference of the housing, is sprung into the housing and finds a seat in a groove cut into the inner wall.

Of the various elements which constitute the friction retarding mechanism, the housing 8 and the pressure plate 44 are non-rotatable; the cam-clutch member 30, with its two washers 38 and 38ª, rotate with the spool shaft at all times. The ring 28 rotates with the shaft only when the spool is moving in the direction of the arrow in Fig. 2; in the opposite direction it is idle. The friction retarding effect of the mechanism is, therefore, exerted between the inner and outer surfaces of the ring 28 and the members 8 and 44 on either side thereof, through the friction disks 26 and 42 when the spool is rotating in the direction of the arrow in Fig. 2.

It will also be observed that the spool shaft is not headed at its outer end, but is free to be withdrawn endwise from the drag mechanism and may be replaced therein without disturbing or disassembling the drag mechanism. This makes it possible to take the spool out of the reel for repairs or the like while the drag mechanism is intact. The drag mechanism is also removable without disturbing any other element of the reel. When the drag mechanism is removed, the reel can be operated as an ordinary reel in either direction of spool rotation. While the drag mechanism is shown and described as located on the back plate, it may be located on the front plate if desirable.

Changes and modifications may be made in specific adaptations of the invention without sacrificing any of the benefits thereof within the scope of the allowed claims.

What is claimed is:

1. In a fishing reel, a spool and a spool shaft, an end plate, a housing on the end plate, the shaft extending into the housing, a plurality of superposed friction elements located in the housing one of which is a ring, and clutch mechanism to lock the spool shaft and the ring in one direction of rotation only, said clutch mechanism comprising a cam wheel located within the ring and having a plurality of surfaces which approach the inner surface of the ring, balls located within the spaces between the ring and the cam wheel, and means to prevent the balls from running on the surface of a friction element at the side of the ring.

2. In a fishing reel, a spool and a spool shaft, friction mechanism for retarding the rotation of the shaft in one direction only, comprising a plurality of superposed friction elements, one of said elements being a ring, a cam member located inside of the ring and rotatable with the shaft, said cam member having at least one non-concentric surface, a ball located in the space between the said surface and the inner wall of the ring, and means on opposite sides of the cam and rotatable therewith, separating the ball from adjacent friction elements.

3. In a fishing reel, a spool and a spool shaft, friction mechanism for retarding the rotation of the shaft in one direction only, comprising a plurality of superposed friction elements, one of said elements being a ring, a cam member located inside of the ring and rotatable with the shaft, said cam member having a plurality of non-concentric surfaces, balls located in the spaces between the said surfaces and the inner wall of the ring, and means on opposite sides of the cam and rotatable therewith, separating the balls from adjacent friction elements.

4. In a fishing reel, a spool and a spool shaft, friction mechanism for retarding the rotation of the shaft in one direction only, comprising a plurality of superposed friction elements, a ring between two of said elements, a cam member located inside of the ring and rotatable with the shaft, said cam member having at least one non-concentric surface facing the inner wall of the ring, a ball located in the space between the said surface and the inner wall of the ring, and disks on opposite sides of the cam member and rotatable therewith, the aggregate thickness of the cam member and disks being substantially equivalent to the thickness of the ring.

5. In a fishing reel, a spool and a spool shaft, friction mechanism for retarding the rotation of the shaft in one direction only, comprising a plurality of superposed friction elements, a ring between two of said elements, a cam member located inside of the ring and rotatable with the shaft, said cam member having a plurality of non-concentric surfaces facing the inner wall of the ring, a ball located in each space between the surfaces and the inner wall of the ring, and disks on opposite sides of the cam member and rotatable therewith, the aggregate thickness of the cam member and disks being substantially equivalent to the thickness of the ring.

6. In a fishing reel, a spool and a spool shaft, a plurality of superposed friction elements located on the shaft, an intermediate friction element being in the form of a ring, a cam wheel inside of said ring and keyed to the shaft, the rim of the cam wheel being formed with a plurality of cam surfaces, a ball lying between each cam surface and the inner wall of the ring, and means rotatable with the shaft to prevent contact of the balls with adjacent friction elements.

7. In a fishing reel, a reel body, a spool and spool shaft, a housing on the reel body, a screw threaded cap on the housing, friction elements associated with the spool shaft and located in the housing, a dish secured to the interior of the cap, and a ring between the disk and the cap rotatably secured thereby to the interior of the cap and having inwardly projecting spring fingers bearing upon the friction elements.

8. In a fishing reel, a reel body, a spool and spool shaft, a housing on the reel body, a screw threaded cap on the housing, friction elements associated with the spool shaft and located in the housing, a ring having spring fingers bearing on the friction elements, a disk to hold the ring on the interior of the cap but to permit its rotation thereon, and means to permit passage of lubricant through the cap and the disk in all positions of adjustment of the cap on the housing.

HERMAN F. KHOENLE.